United States Patent Office 3,513,124
Patented May 19, 1970

3,513,124
ANTIOZONANTS FOR CHLOROPRENE
POLYMERS
James Kalil, Wilmington, Del., assignor to E. I. du Pont de Nemours and Company, Wilmington, Del., a corporation of Delaware
No Drawing. Filed Jan. 31, 1967, Ser. No. 612,792
Int. Cl. C08d 11/04; C09k 3/00
U.S. Cl. 260—45.9                    3 Claims

ABSTRACT OF THE DISCLOSURE

An antiozonant for chloroprene polymers prepared by condensing one mole of hydroquinone with at least two moles of an amine mixture consisting of about 75 to 90% by weight of o-toluidine and about 25 to 10% by weight of an alkyl phenyl amine composition. The phenyl amine composition consists essentially of ring substituted dimethyl anilines or mixtures of dimethyl and ethyl anilines. It is necessary that at least 65% by weight of the alkyl phenyl amine composition be a xylidene from the group 2,3-; 2,4- and 2,5-xylidenes. The antiozonants are solids and are incorporated into the chloroprene polymers in the amount of about 0.05 to 6 parts by weight per 100 parts of polymer during the compounding of the polymer stock. The antiozonants provide excellent protection against ozone attack without adversely affecting storage stability or causing bloom.

BACKGROUND OF THE INVENTION

This invention relates to an antiozonant composition for chloroprene polymers. In particular it relates to a new antiozonant which is a condensation product of hydroquinone with a mixture of o-toluidine and dimethyl anilines or mixtures of dimethyl and ethyl anilines.

Elastomeric chloroprene polymers are exceptionally resistant to attack by atmospheric ozone. However, for certain applications, particularly at high temperatures, it is desirable to stabilize the elastomer to the greatest possible degree by addition thereto of an effective antiozonant. Although compounds having antiozonant effect in chloroprene polymers are known, their use is often accompanied by adverse effects on the compounded polymer; for example, poor bin storage stability of the compounded stock and "blooming." Poor bin storage stability is evidenced by an increase in viscosity of the compounded stock during storage, presumably because of premature chain extension or cross linking. "Bloom" is an unsightly exudate on the surface of the stock which develops when the antiozonant is not sufficiently soluble in the polymer stock and migrates to the surface to form a film thereon. It is further important that the antiozonant be in a physical form such that it can be readily handled in rubber processing procedures; for example, it should not be a tar-like semi-solid. A comminuted solid product is particularly advantageous in this regard.

There has been a need in the choroprene polymer art therefor for an effective antiozonant which does not adversely affect the bin storage stability of the polymer, is sufficiently soluble in the polymer so that it does not migrate to the surface to cause "bloom" thereon and further is in a physical form which makes it easy to handle and incorporate into the polymer.

SUMMARY OF THE INVENTION

According to this invention a new antiozonant for chloroprene polymers is prepared by the condensation of one mole of hydroquinone with at least about two moles of an amine mixture consisting of about 75–90% by weight o-toluidine and about 25–10% by weight of an alkyl phenyl amine composition, said composition consisting essentially of ring substituted dimethyl anilines or mixtures of dimethyl anilines and ethyl anilines, with the proviso that at least about 65% by weight of said phenyl amine composition be one or more xylidines from the group consisting of 2,3-; 2,4- and 2,5-xylidines. The antiozonants of this invention afford good protection against ozone attack, and the chloroprene polymer stocks in which they are incorporated display excellent bin storage stability and little or no bloom when practical amounts of the antiozonant are used. The product is a solid which is easily handled and may be readily incorporated into the polymer stock.

The chloroprene polymers in which the antiozonants of this invention are used are homopolymers of chloroprene (2-chloro-1,3-butadiene) and copolymers of chloroprene with up to an equal weight thereof of a monomer or monomers copolymerizable with the chloroprene. Suitable copolymerizable monomers are compounds containing the group $CH_2=C<$ of the following representative types: vinyl-substituted aromatic compounds, such as styrene, vinyltoluenes, and vinylnaphthalenes; acrylic and methacrylic acids and derivatives thereof such as esters and nitriles, e.g., methyl methacrylate and acrylonitrile; and conjugated diolefinic compounds such as 1,3-butadiene, isoprene, and 2,3-dichloro-1,3-butadiene.

The chloroprene polymers may be of the sulfur-modified type or may be of the type containing no sulfur.

Various commercially available chloroprene polymers in all of which the antiozonants of this invention are useful are described in Encyclopedia of Polymer Science and Technology, volume 3, pages 705–730, Interscience Publishers (1965).

The antiozonant composition of this invention is a condensation product of 1 mole of hydroquinone with at least about 2 moles of an amine mixture of about 75–90% by weight o-toluidine and about 25–10% by weight of an alkyl phenyl amine composition consisting essentially of ring substituted dimethyl anilines or mixtures of dimethyl and ethyl anilines. Any proportions of the dimethyl or ethyl anilines can be used as long as at least 65% by weight of the composition is 2,3-; 2,4- or 2,5-xylidine. Any one or combination of more than one of these xylidine isomers is used to comprise the required amount. Particularly preferred alkyl phenyl amine compositions are those sold commercially as mixed xylidines by various chemical suppliers. These compositions consist essentially of differing proportions of xylidine isomers, ethyl aniline and minor quantities of other alkyl phenyl amines. They are prepared by nitration and subsequent reduction of technical xylene. They have a specific gravity of 0.97–1.00 and a boiling range at atmospheric pressure of about 200–230° C. Representative analyses are indicated in the examples below.

While more than two moles of the amine mixture may be used in carrying out the condensation, there is little practical advantage to be gained, and use of an excess of amine makes it necessary to remove and, preferably, to recover the excess amine. Any of the well-known condensation catalysts may be used, such as metal halides, phosphoric acid, sulfuric acid, and toluenesulfonic acid. The most commonly used catalyst is aluminum chloride. The temperature of the reaction ranges between 175° C. and 325° C., preferably between 200° and 260° C. The reaction is complete when no more water is evolved. Usually a heating period of 8 to 24 hours suffices, although the reaction time will depend on the temperature. Unreacted amine is separated from the reactants by distillation, and the product is solidified. If desired, the particle size of the final product can be reduced by conventional methods. The addition of an antiagglomerating agent, such as fine silica, and an anti-dusting agent, such as mineral oil, is advantageous in rendering the product in a physical form such that it is more easily handled in rubber compounding procedures.

The proportions of o-toluidine and the alkyl phenyl amine composition are critical in preparing the antiozonant composition of this invention. The condensation product of o-toluidine with hydroquinone has considerable merit as an antiozonant but blooms out of the polychloroprene vulcanizates to an undesirable degree. The replacement of at least 10 percent of the o-toluidine with the alkyl phenyl amine composition described above is necessary in order to obtain a product having satisfactory compatibility with the chloroprene polymers. However, if more than about 25% of the amine mixture consists of this composition, the condensate has undesirable physical form. It tends to be a tar-like semi-solid which is difficult to handle. The preferred product is prepared from a mixture of 18-22 percent by weight of the alkyl phenyl amine composition and 82-78 percent by weight of o-toluidine.

The amount of the antiozonant composition to be used in the chloroprene polymers ranges from about 0.05 part to about 6 parts by weight per 100 parts of polymer. At least about 0.05 part is required to give a significant degree of antiozonant effect. The higher amount is limited only by the solubility of the antiozonant in the elastomer and by economics. The preferred amounts range from 1 to 3 parts per 100 parts of elastomer.

The antiozonant of this invention may be used with other conventional compounding ingredients. For maximum stability, it is preferred to use a conventional antioxidant in the compounded stock. The usual fillers, plasticizers, vulcanization accelerators, etc., may be used. These are well-known to those skilled in the art. For a discussion of methods of compounding chloroprene polymers see, for example, Murray and Thompson, "The Neoprenes," Elastomer Chemicals Department, E. I. du Pont de Nemours & Co., copyright 1963.

The invention will be better understood by reference to the following examples wherein parts are by weight unless otherwise indicated.

EXAMPLE 1

This example illustrates the preparation of a condensation product of 10% mixed xylidines and 90% o-toluidine with hydroquinone. The reactor is a one-liter electrically-heated flask equipped with an agitator and an offset vapor takeoff line leading to a water-cooled condenser. The condensed vapors are collected in a decanter, from which the water layer is intermittently removed and the organic phase is continuously returned to the reactor. Prior to heating, the following materials are charged to the reactor:

|  | Grams |
|---|---|
| Phenyl amine composition | 33 |
| o-Toluidine | 297 |
| Hydroquinone | 165 |
| Aluminum chloride | 7 |

The mixture is heated until reflux appears (212° C.). Heating is continued, and the temperature slowly rises to a final temperature of 252° C. The total heating time is 12 hours. When no more water appears in the condensate, vacuum is applied at 252° C. to remove any low-boiling materials. The product is cast in an aluminum pan and allowed to cool and crystallize overnight. The product weighs 398 g. (91% yield based on hydroquinone). It is a solid, having a melting point range of 100-110° C.

The phenyl amine composition used is a technical grade product sold as "Xylidines Mixed o-m-p Technical" by Du Pont. Its distillation range at 760 mm. Hg is as follows:

1st drop—214° C. minimum
95 ml.—223° C. maximum
Dry—230° C. maximum

The amine composition described above has a following typical analysis:

|  | Percent by weight |
|---|---|
| Toluidines | 0.35 |
| 2-ethylaniline | 7.4 |
| 4-ethylaniline | 5.5 |
| 2,4-xylidine | 50.9 |
| 2,6-xylidine | 14.0 |
| 3,5-xylidine | 1.3 |
| 2,5-xylidine | 11.6 |
| 2,3-xylidine | 5.4 |
| 3,4-xylidine | 3.4 |

Purity as determined by the sodium nitrite test, 99% minimum.

EXAMPLE 2

The preparation of a condensation product of 20% phenyl amine composition and 80% o-toluidine with hydroquinone is illustrated in this example.

The procedure is the same as that described in Example 1 except that the following materials are charged:

|  | Grams |
|---|---|
| Phenyl amine composition [1] | 73 |
| o-Toluidine | 290 |
| Hydroquinone | 165 |
| Aluminum chloride | 7 |

[1] Same composition as used in Example 1.

The mixture is heated until reflux appears (208° C.) and heating is then continued over a period of 16 hours. The final temperature reached is 250° C. When no more water appears in the condensate, vacuum is applied at 250° C. to remove low-boiling materials from the product. The product is cast in an aluminum pan and allowed to cool and crystallize overnight. The final product weighs 395 g. (90% yield based on hydroquinone). The product is a solid having a melting point range of 83-108° C.

EXAMPLE 3

This example illustrates the preparation of a condensation product of 25% phenyl amine composition and 75% o-toluidine with hydroquinone. The procedure is the same as that described in Example 1 except that the initial charge is as follows:

|  | Grams |
|---|---|
| Phenyl amine composition [1] | 82.5 |
| o-Toluidine | 247.3 |
| Hydroquinone | 165 |
| Aluminum chloride | 7 |

[1] Same composition as used in Example 1.

The mixture is heated until reflux appears (212° C.) and the heating is continued for a period of 11 hours. The maximum temperature is 255° C. When no more water appears in the condensate, vacuum is applied at 236-250° C. to remove low-boiling materials from the product. The product is then cast in an aluminum pan and allowed to cool and crystallize overnight. The final product weighs 394 g. (89% yield based on hydroquinone). It is a solid, having a melting point range of 75-104° C.

EXAMPLE 4

This example illustrates the physical properties of a typical chloroprene polymer which has been compounded as indicated below and in which the antiobonants of Examples 1-3 have been incorporated. The chloroprene polymer is prepared as described in Example 6 of U.S. Pat. 2,494,087.

|  | Parts by weight |
|---|---|
| Chloroprene polymer | 100 |
| Stearic acid | 0.5 |
| N-Phenyl-1-naphthylamine | 2 |
| Magnesia | 4 |
| Semireinforcing furnace black | 80 |
| Aromatic process oil ("Sundex" 890 supplied by Sun Oil Co., is used) | 35 |
| Zinc oxide | 5 |
| 2-mercapto-2-imidazoline | 0.5 |
| Antiozonant—As shown in Table I. | |

The Mooney scorch properties of the compounded stock are measured at 121° C. immediately after mixing and after aging for two weeks at 38° C. The testing is carried out at 121° C. according to ASTM Method D1646–63. The small rotor is used. The Mooney scorch test is a measure of the increase in viscosity of the polymer and the minimum Mooney viscosity is related to bin storage stability.

The stress/strain properties are obtained on samples which are cured for 20 minutes at 153° C. The method used is ASTM D412–64 T. Hardness (durometer A) is measured at 24° C. by ASTM Method D2240–64 T.

The antiozonant effect is measured by exposing the cured samples to ozone in a test chamber at 40° C. using an ozone concentration of 3 parts per million. For static exposures, samples of the vulcanizates (0.25 x 0.075 x 6 inches in dimension), mounted on varnished wooden racks, are subjected to tensile strains of 20% and 40%, respectively. The dynamic test is carried out by the "roller" method described in Rubber Chemistry and Technology 32, 1119 (1959). The test piece is flexed at a rate of 30 cycles per minute. The number of hours required to produce ejuivalent degrees of cracking are observed.

In the following table the antiozonants are identified as follows:

(A) Antiozonant prepared in Example 1.
(B) Antiozonant prepared in Example 2.
(C) Antiozonant prepared in Example 3.

Table I shows the results of the various tests.

the antiozonants of Examples 1–3 provide excellent protection against ozone attack without significant adverse effect on bin storage stability or causing "bloom."

EXAMPLE 5

This example illustrates the antiozonant effect of the compositions prepared in Examples 1–3 in a claycontaining polychloroprene stock. The following compounding recipe is used:

|  | Parts by weight |
|---|---|
| Chloroprene polymer (same type as in Example 4) | 100 |
| Stearic acid | 0.5 |
| N-Phenyl-1-naphthylamine | 2 |
| Magnesia | 4 |
| Fast-extruding furnace black | 15 |
| Hard clay | 120 |
| Aromatic process oil ("Sundex" 790) | 15 |
| Zinc oxide | 5 |
| 2-mercapto-2-imidazoline | 0.75 |
| Antiozonant—As shown in Table II. | |

The antiozonants are readily incorporated into the polymer stock.

The same tests are used here as are used in Example 4. The same designations for the antiozonants are also used. The results are shown in Table II.

TABLE II

|  | Antiozonant | | | |
|---|---|---|---|---|
|  | A | B | C | None |
| Concentration of antiozonant, parts per per 100 of elastometer | 2 | 2 | 2 | 0 |
| Mooney scorch: | | | | |
| After mixing: | | | | |
| Minimum reading | 31.5 | 32 | 33 | 35 |
| Minutes to 10-point rise | 8.5 | 10 | 10 | 10 |
| After aging: | | | | |
| Minimum reading | 60 | 59 | 60 | 58 |
| Minutes to 10-point rise | 4 | 4.5 | 4.5 | 6.5 |
| Ozone resistance: dynamic exposure, hours to considerable cracking | (¹) | 20 | 26 | 10 |
| Stress/strain properties: | | | | |
| Modulus at 300% elongation, p.s.i. | (¹) | 1,050 | 1,050 | 1,050 |
| Tensile strength at break, p.s.i. | (¹) | 1,800 | 1,875 | 1,875 |
| Elongation at break, percent | (¹) | 650 | 680 | 660 |
| Hardness | (¹) | 73 | 72 | 75 |
| Bloom, two weeks after cure | None | None | None | None |

¹ Not tested.

TABLE I

|  | Antiozonant | | | | | | | |
|---|---|---|---|---|---|---|---|---|
|  | A | A | B | B | C | C | C | None¹ |
| Concentration of antiozonant, parts per 100 of elastomer | 2 | 3 | 2 | 4 | 2 | 4 | 6 | 0 |
| Mooney scorch: | | | | | | | | |
| After mixing: | | | | | | | | |
| Minimum reading | 11 | 10 | 12.5 | 13 | 13 | 13 | 10.5 | 14.5 |
| Minutes to 10-point rise | 20 | 20 | 17 | 16 | 17 | 16 | 16 | 18 |
| After aging: | | | | | | | | |
| Minimum reading | 17 | 16 | 19 | 20 | 19 | 20 | 23 | 18.5 |
| Minutes to 10-point rise | 16 | 15 | 14 | 13 | 15 | 14 | 11 | 17 |
| Ozone resistance: dynamic exposure, hours to considerable cracking | (²) | (²) | 41 | 44 | 27 | 34 | 58 | 12 |
| Stress/strain properties: | | | | | | | | |
| Modulus at 300% elongation, p.s.i. | (²) | (²) | 1,850 | 1,775 | 1,950 | 1,750 | 1,600 | 1,950 |
| Tensile strength at break, p.s.i. | (²) | (²) | 2,250 | 2,275 | 2,375 | 2,200 | 2,200 | 2,250 |
| Elongation at break, percent | (²) | (²) | 380 | 340 | 390 | 390 | 420 | 360 |
| Hardness | (²) | (²) | 64 | 58 | 62 | 58 | 60 | 62 |
| Bloom, two weeks after cure | None | None | None | None | None | None | None | None |

¹ Outside scope of invention, included for comparison purposes only.
² Not tested.

In static ozone exposure tests, none of the vulcanizates containing the antiozonants show cracks after an exposure of 500 hours. In contrast, the control samples fail after an exposure of 34 hours at 20% strain and after 24 hours at 40% strain.

In each instance the antiozonant is readily incorporated into the polymer stock. As is evident from the above data, In the static ozone exposure tests the samples containing no antiozonant fail in 25 hours under 20% strain and in 22 hours under 40% strain, whereas all the samples containing antiozonants show no cracks after an exposure of 500 hours. The data indicate that the antiozonants of Examples 1–3 afford adequate protection against ozone attack without significant effect on bin storage stability and do not cause "bloom."

EXAMPLE 6

The antiozonant of Example 1 is tested in a stock containing no process oil using the following compounding recipe:

| | Parts by weight |
|---|---|
| Chloroprene polymer (same type as in Example 4) | 100 |
| Stearic acid | 0.5 |
| N-Phenyl-1-naphthylamine | 2 |
| Magnesia | 4 |
| Semireinforcing furnace black | 29 |
| Zinc oxide | 5 |
| 2-mercapto-2-imidazoline | 0.5 |
| Antiozonant—As shown in Table III. | |

The antiozonant is readily incorporated into the polymer stock.

TABLE III

| Concentration of antiozonant, parts per 100 of polymer | 2 | 1 0 |
|---|---|---|
| Mooney scorch: | | |
| After mixing: | | |
| Minimum reading | 27 | 25.5 |
| Minutes to 10-point rise | 9.5 | 10.5 |
| After aging: | | |
| Minimum reading | 45 | 34 |
| Minutes to 10-point rise | 7 | 9 |
| Ozone resistance: dynamic exposure, hours to considerable cracking | 168 | 44 |
| Stress/strain properties: | | |
| Modulus at 300% elongation, p.s.i | 1,700 | 1,925 |
| Tensile strength at break, p.s.i | 3,275 | 3,275 |
| Elongation at break, percent | 460 | 430 |
| Hardness | 58 | 60 |
| Bloom, two weeks after cure | None | None |

[1] Outside scope of invention, included for comparison purposes only.

In the static tests for ozone resistance the test pieces containing the antiozonant show no cracking after an exposure of 500 hours whereas the samples containing no antiozonant fail after 90 hours under 20% strain and after 70 hours under 40% strain.

The data indicate good protection against ozone attack without adverse effect on the physical properties and without causing bloom.

EXAMPLE 7

In this example an antiozonant composition is prepared as described in Example 1 except that an alkyl phenyl amine composition having the following composition is used:

| | Percent by weight |
|---|---|
| Toluidines | 0.1 |
| 2-ethylaniline | 3.7 |
| 4-ethylaniline | 4.6 |
| 2,4-xylidine | 37.8 |
| 2,5-xylidine | 19.6 |
| 2,6-xylidine | 9.1 |
| 3,5-xylidine | 0.5 |
| 2,3-xylidine | 16.3 |
| 3,4-xylidine | 8.0 |

The composition is commercially available as "Xylidines Technical," from Eastman Kodak Co.

It has a specific gravity of 0.98 and a boiling point of 200–216° C.

Two parts of the composition prepared as described above is evaluated in the same compounding recipe as used in Example 5. No cracks are observed in the vulcanizate after exposures of 500 hours in the static ozone exposure tests.

TABLE IV

| | Test sample | Control (no antiozonant) |
|---|---|---|
| After mixing: | | |
| Minimum reading | 34 | 35 |
| Minutes to 10-point rise | 7.5 | 10 |
| After aging: | | |
| Minimum reading | 65.8 | 58 |
| Minutes to 10-jpoint rise | 3 | 6.5 |
| Bloom two weeks after cure | None | None |

The antiozonant of this example is a solid; no difficulty is encountered in incorporating it into the polymer stock. The data indicate good protection against ozone attack with no appreciable adverse effect on the physical properties of the polymer and no "bloom."

EXAMPLE 8

This example illustrates the use of the antiozonants of this invention in a sulfur-modified copolymer of chloroprene and 2,3-dichloro-1,3-butadiene of the type described as Polymer 1 B, of Example 1, of the British Pat. 1,044,847 and French Pat. 1,426,602.

The antiozonant has the same composition as the product of Example 2 except that 100 parts of the powdered antiozonant has been mixed with 2 parts of calcium silicate and 3 parts of a naphthenic petroleum oil.

The compounding recipe is:

| | Parts by weight |
|---|---|
| Chloroprene polymer | 100 |
| Stearic acid | 0.5 |
| N-phenyl-1-naphthylamine | [1] 2 |
| Magnesia | 4 |
| Semireinforcing furnace black | 58 |
| Naphthenic oil | 10 |
| Tetraethylthiuram disulfide | 1 |
| Diphenylguanidine | 0.25 |
| Zinc oxide | 5 |
| Antiozonant—As shown in Table V. | |

[1] Omitted in one compounding recipe.

The antiozonant is readily incorporated in the stock. The results of the various tests are shown in Table V.

TABLE V

| Concentrarion of antiozonant, parts per 100 of elastomer | 1 | 2 | 2 [1] | 3 | 0 [2] (control) |
|---|---|---|---|---|---|
| Mooney scorch: | | | | | |
| After mixing: | | | | | |
| Minimum reading | 17.5 | 17 | 18 | 17 | 17.5 |
| Minutes to 10-point rise | 35 | 33 | 34 | 30 | 37 |
| After aging: | | | | | |
| Minimum reading | 19 | 18 | 18 | 18 | 19 |
| Minutes to 10-point rise | 30 | 30 | 30 | 26 | 36 |
| Ozone resistance: dynamic exposure, hours to considerable cracking | 28 | 37 | 34 | 41 | 20 |
| Bloom, two weeks after cure | None | None | None | Trace | None |

[1] N-phenyl-1-naphthylamine omitted.
[2] Outside the scope of invention, included for comparison purposes only.

In the static ozone exposure tests all experimental samples show no cracking after 600 hours' exposure whereas the control has failed in 47 hours at 20% strain and in 46 hours under 40% strain. The data indicate good protection against ozone with no significant adverse effect on polymer properties or bloom.

What is claimed is:

1. An antiozonant for chloroprene polymers which does not cause bloom or adversely affect bin storage stability, said antiozonant being prepared by condensing 1 mole of hydroquinone with at least 2 moles of an amine mixture consisting essentially of about 75–90% by weight o-toluidine and 25–10% by weight of mixed xylidines and removing unreacted starting materials from the reaction product.

2. An antiozonant of claim 1 wherein the amine mixture is about 78–82% by weight o-toluidine and about 18–22% by weight mixed xylidines.

3. A chloroprene polymer having incorporated therein the antiozonant of claim 1 in the amount of about 1 to 6 parts by weight per 100 parts of polymer, said chloroprene polymer being from the group consisting of chloroprene homopolymers and copolymers of chloroprene with up to about an equal weight thereof of at least one monomer containing the group $CH_2{=}C{<}$ copolymerizable with chloroprene.

References Cited

UNITED STATES PATENTS

| | | | |
|---|---|---|---|
| 1,975,734 | 10/1934 | Semon | 260—45.9 |
| 2,087,199 | 7/1937 | Clifford | 260—45.9 |
| 2,053,785 | 9/1936 | Semon | 360—45.9 |
| 2,238,320 | 4/1941 | Hardman | 260—45.9 |
| 3,247,161 | 4/1966 | Cox | 260—45.9 |

FOREIGN PATENTS 1,012,945  12/1965  Great Britain.

OTHER REFERENCES

Scott: "Atmospheric Oxidation and Antioxidants," Elsevier Publishing Co., June 1965, pp. 234–235, 490–493.

HOSEA E. TAYLOR, JR., Primary Examiner

U.S. Cl. X.R.

252—401, 260—576

PO-1050
(5/69)

UNITED STATES PATENT OFFICE
CERTIFICATE OF CORRECTION

Patent No. 3,513,124      Dated May 19, 1970

Inventor(s) James Kalil

It is certified that error appears in the above-identified patent and that said Letters Patent are hereby corrected as shown below:

Claim 4 has been omitted.

4. The polymer stock of Claim 3 in which the antiozonant is incorporated in the amount of about 1-3 parts by weight per 100 parts of polymer.

In the heading to the printed specification, line 9, "3 Claims." should read -- 4 Claims. --.

SIGNED AND
SEALED

SEP 29 1970

(SEAL)
Attest:

Edward M. Fletcher, Jr.
Attesting Officer

WILLIAM E. SCHUYLER, JR.
Commissioner of Patents